(12) United States Patent
Vasquez

(10) Patent No.: US 11,484,956 B1
(45) Date of Patent: Nov. 1, 2022

(54) CARPENTER'S ACCORDION

(71) Applicant: Jorge Vasquez, South Tamworth, NH (US)

(72) Inventor: Jorge Vasquez, South Tamworth, NH (US)

(*) Notice: Subject to any disclaimer, the term of this patent is extended or adjusted under 35 U.S.C. 154(b) by 0 days.

(21) Appl. No.: 17/337,404

(22) Filed: Jun. 2, 2021

(51) Int. Cl.
| | |
|---|---|
| *B26D 7/01* | (2006.01) |
| *B65H 1/00* | (2006.01) |
| *B23D 47/04* | (2006.01) |
| *B27B 5/18* | (2006.01) |
| *B25H 1/04* | (2006.01) |

(52) U.S. Cl.
CPC ............ *B23D 47/042* (2013.01); *B25H 1/04* (2013.01); *B27B 5/181* (2013.01)

(58) Field of Classification Search
CPC ... B23B 25/06; B23B 2260/092; B23B 49/00; B23D 59/008; B23D 59/002; B23D 47/00; B23D 47/02; B25C 7/00; B25F 5/00; B24B 49/12; B27B 27/02; B27B 27/04; B27B 27/10; B23Q 1/74; B23Q 1/00; B23Q 1/0063; B25H 1/04; Y10T 83/773; Y10T 83/95; Y10T 83/849; Y10T 83/7705; Y10T 83/7722
USPC ... 83/156, 477.2, 471, 953, 473, 486, 471.2, 83/471.3, 856; 144/288, 285, 286.1, 287; 108/48, 64, 65, 77; 248/150
See application file for complete search history.

(56) References Cited

U.S. PATENT DOCUMENTS

| | | | | |
|---|---|---|---|---|
| 2,555,217 | A | | 5/1951 | Young |
| 3,013,757 | A | * | 12/1961 | Brammer .............. A47B 81/007 248/150 |
| 3,931,751 | A | * | 1/1976 | Simonson .......... B23D 57/0092 83/477.2 |
| 4,068,551 | A | * | 1/1978 | Kreitz .................. B23D 47/025 108/77 |
| 4,191,111 | A | * | 3/1980 | Emmert ................ A47B 3/0916 248/440 |
| 4,406,200 | A | | 9/1983 | Kerr |
| 4,817,693 | A | | 4/1989 | Schuler |
| 4,830,076 | A | | 5/1989 | Feyer |
| 4,964,450 | A | | 10/1990 | Hughes et al. |
| 5,497,816 | A | * | 3/1996 | Darland ............... B23D 47/025 248/676 |
| 6,192,779 | B1 | * | 2/2001 | Hartmann ................. F16N 7/14 83/101 |
| 6,546,978 | B2 | | 4/2003 | Thoman |
| 6,668,696 | B1 | | 12/2003 | Krohmer et al. |
| 6,672,348 | B2 | | 1/2004 | Ransom et al. |
| 6,814,333 | B1 | * | 11/2004 | Freiburger ............. F16M 11/38 248/164 |

(Continued)

FOREIGN PATENT DOCUMENTS

| | | |
|---|---|---|
| WO | 9746138 A1 | 12/1997 |
| WO | 2016173936 A1 | 11/2016 |

*Primary Examiner* — Ghassem Alie
(74) *Attorney, Agent, or Firm* — Patent Negotiator, PLLC; Sarita Pickett

(57) ABSTRACT

A carpenter's accordion is disclosed herein. The carpenter's accordion is a portable, compactable, and free-standing tool that may be advantageously used in combination with a table saw to increase the length of stock that one user can cut with a blade. Generally, the more sections that comprise the carpenter's accordion, the greater the lengths of stock one user will be able to cut using a table saw or other similar tool in combination with the accordion.

14 Claims, 6 Drawing Sheets

(56) References Cited

U.S. PATENT DOCUMENTS

| | | | |
|---|---|---|---|
| 7,231,858 B2 | 6/2007 | Oberheim | |
| 7,647,872 B2 | 1/2010 | Pitchford | |
| 7,766,125 B2 * | 8/2010 | Fowler | B25H 1/06 |
| | | | 182/163 |
| 7,784,749 B2 * | 8/2010 | Radermacher | F16M 11/242 |
| | | | 198/782 |
| 7,882,871 B2 * | 2/2011 | Gilmour | B25H 3/06 |
| | | | 144/287 |
| 8,096,246 B2 * | 1/2012 | Carter | A47B 3/002 |
| | | | 108/115 |
| 8,857,350 B2 * | 10/2014 | Carter | A47B 3/12 |
| | | | 108/115 |
| 9,527,144 B2 | 12/2016 | Frolov | |
| 2004/0084110 A1 * | 5/2004 | Gilmour | B23D 47/06 |
| | | | 144/287 |
| 2005/0045781 A1 * | 3/2005 | Brazell | B25H 1/04 |
| | | | 83/477.2 |
| 2006/0101961 A1 * | 5/2006 | Etter | B27B 27/02 |
| | | | 83/520 |
| 2009/0120257 A1 * | 5/2009 | Carter | B27B 9/04 |
| | | | 83/13 |
| 2010/0192812 A1 * | 8/2010 | Yul | A47B 13/003 |
| | | | 108/50.11 |
| 2012/0048090 A1 | 3/2012 | Etter et al. | |

\* cited by examiner

CARPENTER'S ACCORDION

BACKGROUND

Technical Field

The present disclosure relates generally to cutting methods and systems utilizing a table saw to cut stock, such as wooden stock. More particularly the present disclosure relates to a carpenter's accordion, which may be advantageously used in combination with a table saw to provide support extension for long pieces of stock being cut by the blade on the table saw.

Description of Related Art

Woodcutting and carpentry are well developed fields of art. Table saws are a tool typically used in the art to perform different types of cuts (e.g., bevel cuts, miter cuts, cross cuts, rip cuts, etc.) on a piece of wood or stock. A person skilled in the art of woodcutting or carpentry may use known methods to cut a particularly long piece of stock length-wise on their own. This type of cut is commonly referred to as a rip cut.

There are numerous problems that a woodcutter or carpenter may encounter when performing a rip cut on their own, and an even greater number of potential solutions to these problems. Some carpenters have tried utilizing free-standing tripod stands having a single support roller to assist them when rip cutting particularly long pieces of stock; however, the tripod stand option is unstable, bulky, and overall inefficient. There is a lack of free-standing support alternatives known in the art for single-person rip cutting, and this need has been long felt in the art.

Therefore, what is needed is a carpenter's accordion having the following characteristics and benefits over the prior art.

SUMMARY

The subject matter of this application may involve, in some cases, interrelated products, alternative solutions to a particular problem, and/or a plurality of different uses of a single system or article.

In one aspect, a carpenter's accordion is disclosed. The carpenter's accordion may comprise two sections, wherein each section may comprise two legs having tops and bottoms. Each section may be connected by two sets of a plurality of movable bars attached to legs of opposite sections, and each leg of the same section may be connected to opposite ends of a plurality of cross support bars and opposite ends of a pipe at the top of each leg of the same section.

In another aspect, a system of using the carpenter's accordion is disclosed. The carpenter's accordion may be used in combination with a table saw that is separate from the free-standing accordion. The table saw may comprise a blade attached to the top surface of the table saw, a body connected to the top surface and supported by a plurality of supporting legs. The table saw may also comprise an outfeed support that is connected to a plurality of telescoping outfeed support bars connected to either the top surface or the body of the table saw.

It should be expressly understood that the various elements of the present may be of varying sizes, shapes, or otherwise dimensions without straying from the scope of the present disclosure.

DETAILED DESCRIPTION

Figure 1:
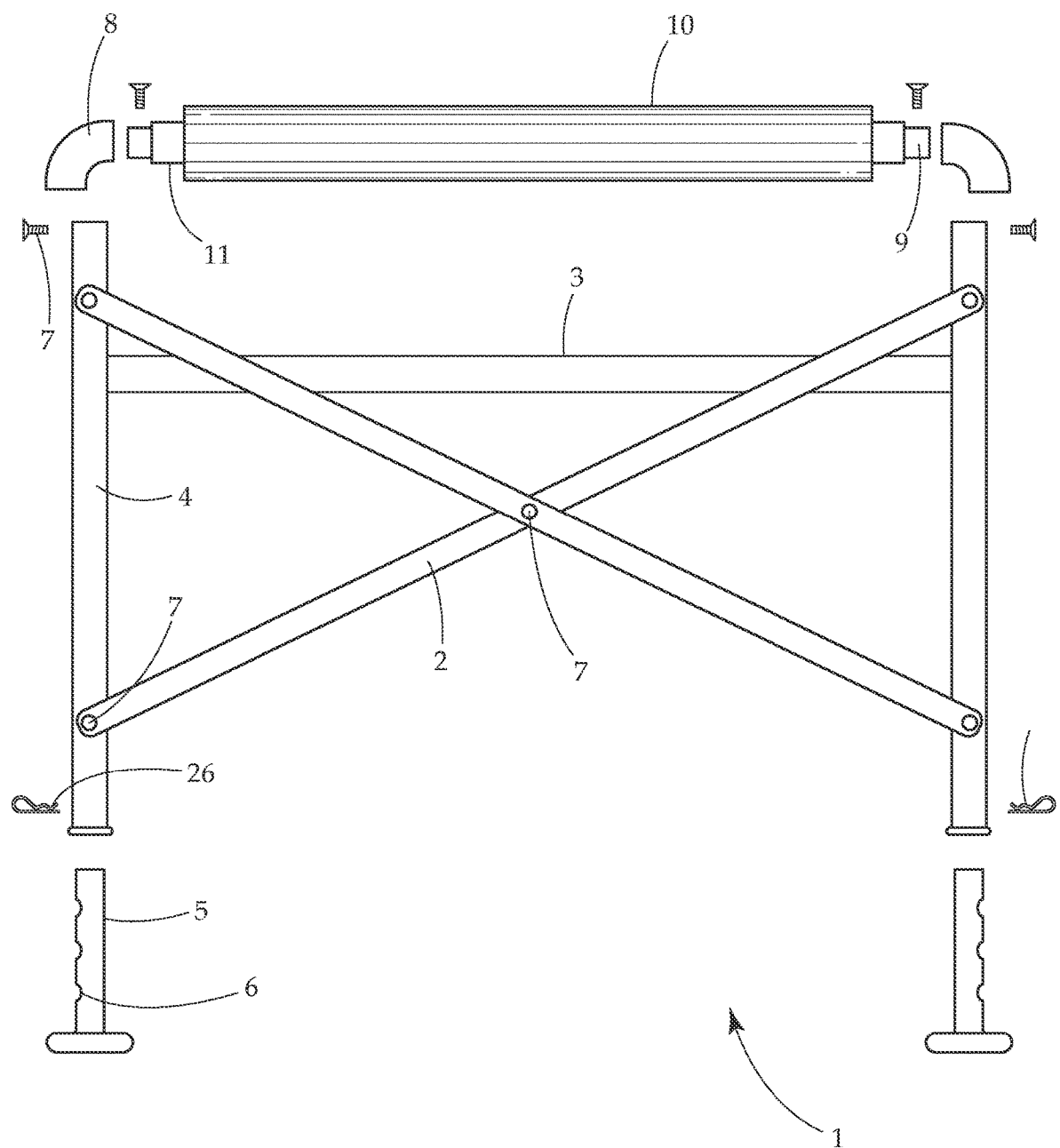
FIG. 1 provides a perspective view of a partially exploded embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns methods and systems utilizing a table saw or other similar tools to cut stock. More specifically, the present disclosure concerns a carpenter's accordion that may be advantageously used with, preferably, a table saw while rip cutting stock. It is an object of the present disclosure to provide a portable solution that may be used in conjunction with a table saw to allow a solo user cutting long pieces of stock on their own to effectively extend the points at which a particular piece of stock is supported. It is another object of the present disclosure to provide a convenient solution for leveling the accordion and the table saw so that pieces of stock being cut by the blade are not impeded by an unlevel surface contacting a portion of the stock.

A carpenter's accordion is disclosed herein. In most embodiments, the carpenter's accordion is constructed generally from the following elements, including, but not limited to: legs, cross support bars, lateral support bars, curved corner pieces, pipes, wheel bearings, movable bars, rollers, telescoping stands, and more. The assembly of the various elements may be accomplished using any number of methods, and connections between individual elements may be accomplished using a variety of connection securing methods, including, but not limited to: pins, washers, bolts, screws, butterflies, and many more. The individual elements whose assembly forms the carpenter's accordion may be made from any suitable material or combination of suitable materials. For example, in some embodiments, the legs, the cross support bars, and the movable bars may be made from wood; the pipe and the curved corner pieces may be made from metal; and the roller may be made from a vinyl material, such as PVC. In other embodiments, each element may be made from a vinyl material.

The carpenter's accordion may generally comprise a plurality of individual sections that may then be connected to each other by being connected to opposite ends of a plurality of movable bars. The movable bars may allow the accordion to compress and expand fully or incrementally. In some embodiments, the plurality of movable bars may comprise a series of interconnected bars defining the shape of several X-shapes when the accordion is fully extended. In these embodiments, the opposite ends of the plurality of movable bars may refer to the ends at which the series of interconnected bars connects to at least two different sections of the accordion. In other embodiments, the plurality of movable bars may comprise two bars, a first bar and a second bar, each having two ends, wherein one of the two ends of the first bar and the second bar may be connected to one section of the accordion and the other one of the two ends of the first bar and the second bar may be connected to another section of the accordion. In these embodiments, the opposite ends of the plurality of movable bars may refer the two ends of the first bar and the second bar. In most embodiments, the movable bars may also be connected to each other at least once.

In most embodiments, the carpenter's accordion may comprise two sections, a first section and a second section; however, the carpenter's accordion may comprise at least one additional section (e.g., a third section, a fourth section, etc.). In most embodiments, each section may comprise at least two legs. Each leg in every section may have a top and a bottom. For example, in embodiments where the carpenter's accordion may comprise two sections and each section may comprise two legs, the carpenter's accordion may comprise four legs total. In some embodiments, the at least two sections of the carpenter's accordion may be connected to each other by connecting opposite ends of two sets of a plurality of movable bars to legs of opposite sections. In other words, the legs of one section may be connected to the legs of the other section by being connected to opposite ends of two sets of movable bars. For example, in most embodiments, a first leg of one section may be connected to a first leg of another section by both legs being connected to one of the ends of a set of movable bars. Similarly, a second leg of one section may be connected to a second leg of another section by both legs being connected to one of the ends of another set of movable bars. The connection between the movable bars and the legs of opposite or different sections may be accomplished using a variety of methods. For example, in some embodiments, the opposite ends of the plurality of movable bars may be connected to legs of opposite or different sections by a plurality of butterfly, bolt, and washer combinations. Similarly, in embodiments where the movable bars may be connected to each other, the movable bars may be connected by at least one such combination, or a similar combination.

As previously established, in most embodiments, the movable bars may allow for the contraction, compression, folding, or otherwise movement of individual sections of the accordion. For example, in some embodiments, the movable bars may allow two or more sections to be folded towards each other. In these embodiments, the legs of the sections may come into contact or nearly come into contact with one another when the accordion is in a fully compressed or folded position. To facilitate the locking of the accordion in such a position, the legs may comprise hook and loop fasteners, such as a strip of Velcro®, or other types of structures that are capable of holding the accordion in a fully folded position (e.g., magnets, hook and eye latches, etc.). Alternatively or simultaneously, some embodiments may use a continuous strap of hook and loop fastening material, such as a strap of Velcro®, separate from the accordion that may be wrapped and secured around the accordion, which may lock the accordion in the fully compressed or folded position. These methods and securing structures may allow the accordion to be easily transported by the user.

In some embodiments, the movable bars may also prevent misalignment of one section with respect to another section. Similarly, in most embodiments, cross support bars and lateral support bars may provide support and prevent the misalignment of one of the legs of a section with respect to another leg of the same section. The cross support bars and lateral support bars may have opposite ends. In some embodiments legs of the same section may be connected to opposite ends of a plurality of cross support bars. The connections between the cross support bars and the legs of the same section may be accomplished using a variety of methods. For example, in some embodiments, opposite ends of the plurality of cross support bars or lateral support bars may be connected to the legs of the same section by a plurality of screws. In many embodiments, the cross support bars may also be connected to each other in a similar way using a similar structure or method as that of the cross support bars or lateral support bars and the legs of the same section.

Additional support may be provided by a pipe in each section. In some embodiments, each section comprises a pipe having two ends, a first end and a second end. The pipe may be connected at opposite ends to the tops of legs of the same section. For example, the first end of the pipe may be connected to one of the two legs of a section, and the second end of the pipe may be connected to the other one of the two legs of the same section. In some embodiments, the opposite ends of one of the pipes may be connected to two legs of the same section by at least one screw. In other embodiments, the accordion may comprise curved corner pieces connected to the pipe and the legs of the same section. In most embodiments, the accordion may comprise two curved corner pieces in each section and the curved corner piece may comprise two ends. For example, one end of each curved corner piece may be connected to the top of each leg in a section, and the other end of the curved corner piece may be connected to an end of the pipe of the same section. The pipes and the legs may connect to the curved corner pieces by fitting inside opposite ends of the same and being screwed in place. The use of curved corner pieces may be one of the ways in which opposite ends of the pipe are connected to legs of the same section.

In some embodiments, the carpenter's accordion comprises a plurality of rollers having interiors and exteriors. In most embodiments, each section of the accordion comprises one roller. For example, in embodiments of the accordion that comprise two sections, the accordion may comprise two rollers. The pipe of a section, connected at opposite ends or at each one of its two ends to legs of a section, may extend through the interior of a roller of the same section. In this way, the pipe may be considered to be journaled through the interior of the roller. The pipes of each section may also comprise wheel bearings. In some embodiments, a pipe may comprise two wheel bearings, and each one of the wheel bearings may be positioned at one of the two opposite ends of the pipe. The wheel bearings may also contact the interiors of each of the rollers on the accordion. The wheel bearings may allow the rollers to rotate when force from a piece of stock is applied to the roller. This may provide a longer lifespan to the rollers by allowing them to move smoothly with stability.

In order to provide additional stability and prevent movement of the carpenter's accordion with respect to a table saw, when used in combination therewith in one of the systems or methods disclosed herein, many embodiments of the carpenter's accordion may utilize stands. In some embodiments, each leg of the carpenter's accordion may have a stand connected to the bottom of each leg. For example, the legs of the first section and the legs of the second section may each comprise a stand. Further, the stand may comprise a telescoping portion that is fitted within the bottom of each leg of every section. For example, in embodiments where each section comprises two legs and each leg comprises a stand, the carpenter's accordion may comprise four stands and, consequently, four telescoping portions of the stands. Each stand may comprise feet connected to the telescoping portion of the stand. The underside of the feet of each of the stands may comprise a piece of rubber or other similar material that may increase the frictional coefficient of the stand with respect to the floor that the stand is mounted on. In the embodiments that utilize this feature, additional inertia preventing the stand from being moved when engaging with or coming into contact with stock from the table saw may be provided by the static frictional force generated between the material on the bottom of the stand and the surface upon which the stand may rest.

The surface upon which the accordion rests may not always be a level surface. In these environments, the embodiments of the accordion that utilize telescoping stands or stands having telescoping portions may be particularly advantageous. In some embodiments, the carpenter's accordion may comprise a plurality of pins, and the telescoping portion of each of the stands may define a plurality of fixing apertures. The pins may extend through the bottom of each one of the legs of the accordion and engage with one of a plurality of fixing apertures defined in the telescoping portion of the stands. For example, in the embodiments where the carpenter's accordion comprises two sections and each section comprises two legs having a stand, the carpenter's accordion may comprise four pins to extend through the bottom of each of the four legs. In this example, the telescoping portions of each of the four stands may comprise a plurality of fixing apertures, and each one of the four pins may engage with one the plurality of fixing apertures to fix each leg and stand in place. In some embodiments, the individual fixing apertures may be separated from each other at a length of no greater than half an inch. In these embodiments, the greater the number of fixing apertures, the mores choices a user has to adjust the heights of individual legs. In most embodiments, each of the telescoping stands may be adjusted individually to produce legs fixed at varying heights. This may provide the user greater flexibility when incrementally adjusting the heights of the legs based on surfaces having varying elevations upon which the legs may rest. In some embodiments, the legs may not utilize stands; rather, each one of the legs of the accordion may comprise at least two telescoping sections. One of the telescoping sections may define a plurality of fixing apertures and another telescoping section may comprise a locking mechanism that engages with at least one of the fixing apertures. This telescoping leg embodiment may provide a similar functionality to the embodiments utilizing a leg and stand.

In some embodiments, the carpenter's accordion may also comprise a laser level. The laser level may be attached to one of the sections of the accordion. In some embodiments, the laser level may be attached to one of the pipes or one of the legs, preferably at the top. The laser level may also be attached to any one of the cross support bars, lateral support bars, wheel bearings, or rollers, or any other element on the accordion. In a few embodiments, the laser level may also be separate from the accordion and simply incorporated into the method or system of using the accordion and the table saw. In most embodiments, the purpose of the laser level may be to ensure that the top of the accordion is substantially level with the peak of the outfeed support and the table saw. In some embodiments, the top of the accordion may be the peaks of the rollers. In these embodiments, the laser level may be used to ensure that the peaks of the rollers are substantially level with the peak of the outfeed support and the top surface of the table saw. The purpose of ensuring that the top of the accordion is substantially level with the table saw's top surface and outfeed support, in embodiments utilizing this elements, may be to prevent the top of the accordion from being higher than the top surface of the table saw. The top of the accordion being higher or more elevated than the top surface of the table saw may cause stock to collide with the accordion rather than slide over the top. Such a collision, however, slight, may cause the stock to be pushed back toward the blade and potentially cause the stock to become unaligned, which may result in an uneven cut to the stock. The combination of the laser level, either by its attachment to the accordion or its use in conjunction therewith may be one of the ways in which the present disclosure accomplishes one of its objects of providing a convenient solution for leveling the accordion, the table saw, and other elements herein disclosed.

In some embodiments, a stock cutting system is utilized. The stock cutting system may comprise the carpenter's accordion, the table saw, and a piece or pieces of stock to be cut. The carpenter's accordion may comprise any of the elements described and disclosed herein. The table saw may comprise any aspects which are known in the art at the time of filing, including, but not limited to: a blade, a top surface connected to a body, which is supported by a plurality of supporting legs, and an outfeed support connected to outfeed support bars, which may be telescoping bars capable of extending away from the table and being pushed back into the table. The telescoping outfeed support bars may be connected to the body or the top surface of the table. The piece or pieces of stock may comprise pieces of wood or other material capable of being cut by the blade of the table saw. The stock may contact the top surface of the table saw and have a great enough length to extend away from the top surface of the table saw and engage with one of the sections of the carpenter's accordion.

In some embodiments of the system, the table saw may comprise a laser level. The laser level may be attached to any one of the elements of the table saw, including, but not limited to the top surface of the table saw, the body of the table saw, the outfeed support, or the telescoping outfeed support bars. In other embodiments, one of the telescoping outfeed support bars may define a housing and comprise a laser level, wherein the laser level may be encased within the housing. The laser level may contain an independent battery source that may be accessible from the exterior of the telescoping outfeed support bars. Additionally, the laser level may be operable from outside the telescoping outfeed support bar. Alternatively or simultaneously, the laser level may be operable from a control on the body of the table saw. In some embodiments, the laser level may be electrically connected to a power source within the body of the table saw. In some embodiments, the accordion and the table saw may each comprise a laser level.

A method of using the carpenter's accordion in a stock cutting process is also disclosed herein. The method may use various elements or combination of elements of the carpenter's accordion or the stock cutting system utilizing the accordion, as described herein, in various stages or combination of stages. In some embodiments, the method may comprise the steps of: constructing or providing a carpenter's accordion; providing a table saw; positioning the accordion substantially in line with a face of the table saw; leveling the top of the carpenter's accordion with the top surface of the table saw; extending or collapsing individual telescoping stands or individual telescoping portions of legs of the accordion to further level or position the accordion; providing a piece of stock; adjusting the blade position on the table saw, turning on the table saw, and performing a cut on a piece or pieces of stock, wherein the piece or pieces of stock have lengths great enough to extend away from the table saw and contact the top of at least one section of the table saw. In some embodiments, the method may comprise the additional steps of: extending the outfeed support away from the table saw; leveling the top of the accordion or the peaks of the rollers of the accordion with the outfeed support and the top surface of the table saw; using a laser level to perform any of the aforementioned leveling steps, wherein the laser level may be connected or attached to at least one of the table saw or the carpenter's accordion.

Turning now to FIG. 1 which shows a partially exploded embodiment of a section 1. The section 1 comprises two legs 4 connected to each other by being connected to opposite ends of cross support bars 2. In this embodiment, the cross support bars 2 are secured to each other and legs 4 by a plurality of screws 7. In this embodiment, the legs 4 are also connected to a lateral support bar 3. The bottom of each leg 4 will be connected to a stand 5 by fitting a telescoping portion of each stand 5 within each leg 4. This embodiment allows each stand 5 to telescope in and out of each leg 4. In this embodiment, the portion of the stand 5 that is able to telescope with respect to leg 4 defines a plurality of fixing apertures 6. When a pin 26 on the bottom of each leg 4 extends through the leg 4 and engages with a fixing aperture 6, the stand 5 and the leg 4 lock in place, and, consequently, the height of the leg 4 becomes fixed. In this embodiment, the top of each leg 4 will be connected to a curved corner piece 8 which will also be connected to a pipe 9. Opposite ends of the pipe 9 will be attached to separate curved corner pieces 8, and the pipe 9 extends through a roller 10 and comprises two wheel bearings 11 on opposite ends of the pipe 9. The wheel bearings 11 contact the interior of the roller 10 and allow the roller 10 to move smoothly with stability.

Figure 2:
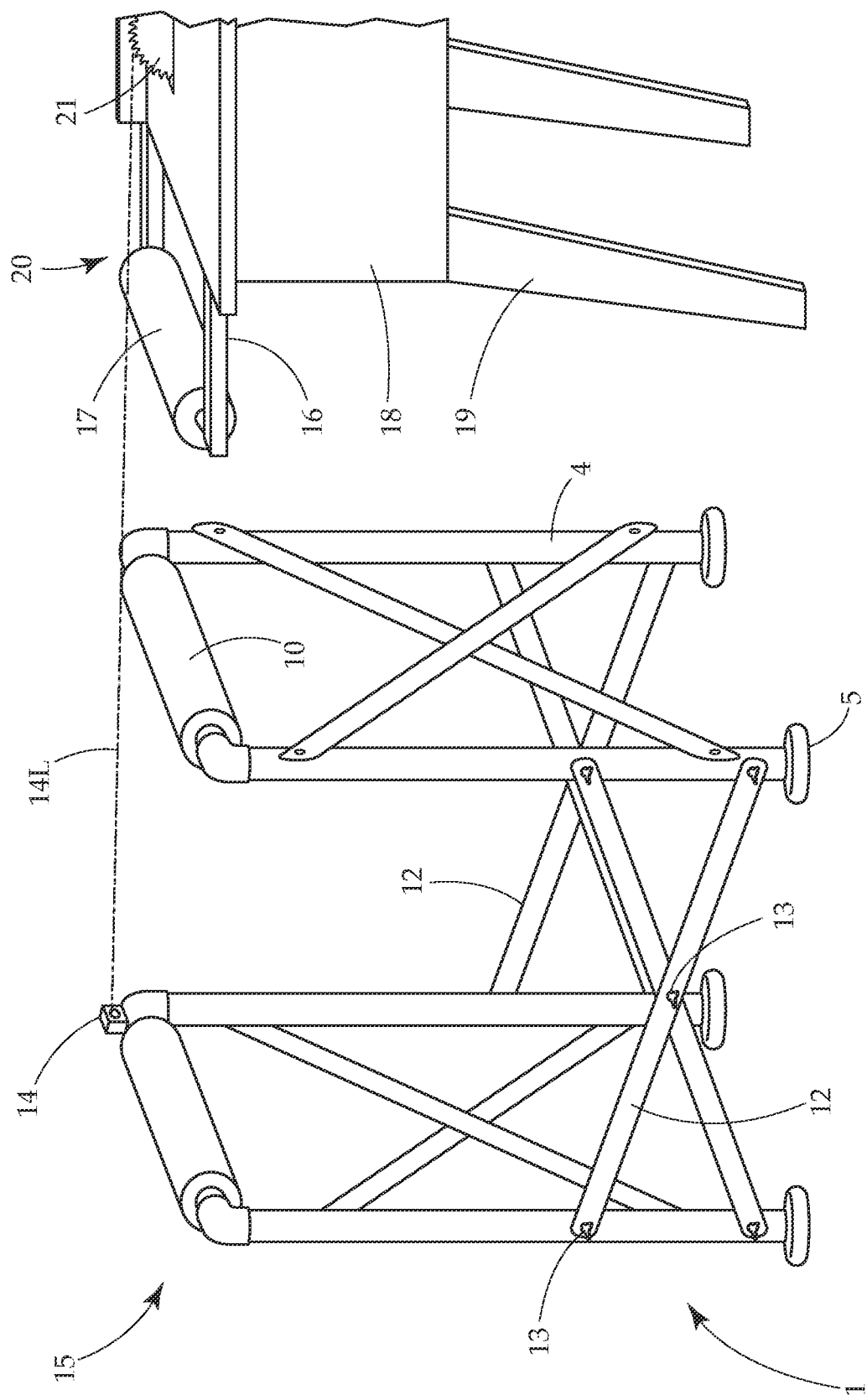
FIG. 2 provides a perspective view of another embodiment of the present disclosure.

FIG. 2 shows an embodiment of the carpenter's accordion 15 and a table saw 20. In this embodiment, the carpenter's accordion 15 comprises two sections 1. The sections 1 are connected to each other by being connected to opposite ends of two sets of movable bars 12. In this embodiment, the movable bars 12 are connected to each other and each section 1 by a plurality of butterfly, bolt, and washer combinations 13. In this embodiment, the carpenter's accordion 15 also comprises a laser level 14 attached to the top of the carpenter's accordion 15. The laser level 14 emits a light beam 14L, which helps ensure that the peak of at least one roller 10 is substantially level with the outfeed support 17. In this embodiment, the outfeed support 17 is connected to and extends away from the table saw 20 by a plurality of telescoping outfeed support bars 16. The telescoping outfeed support bars 16, and, consequently, the outfeed support 17 attached to them are capable of telescoping into and away from the table 20. The table saw 20 comprises a blade 21 attached to the top surface of the table 20 and the top surface is connected to a body 18, which is supported by a plurality of supporting legs 19. In this embodiment, the height of the table saw 20 is fixed by supporting legs 19 when the supporting legs 19 are fully extended. The stands 5 on each of the legs 4 of the carpenter's accordion 15 are able to telescope, adjust, and fix the height of each respective leg 4 to ensure that the peaks of the rollers 10 are substantially level with plane of the top surface of the table saw 20 and the outfeed support 17, and in line with the blade 21.

Figure 3:
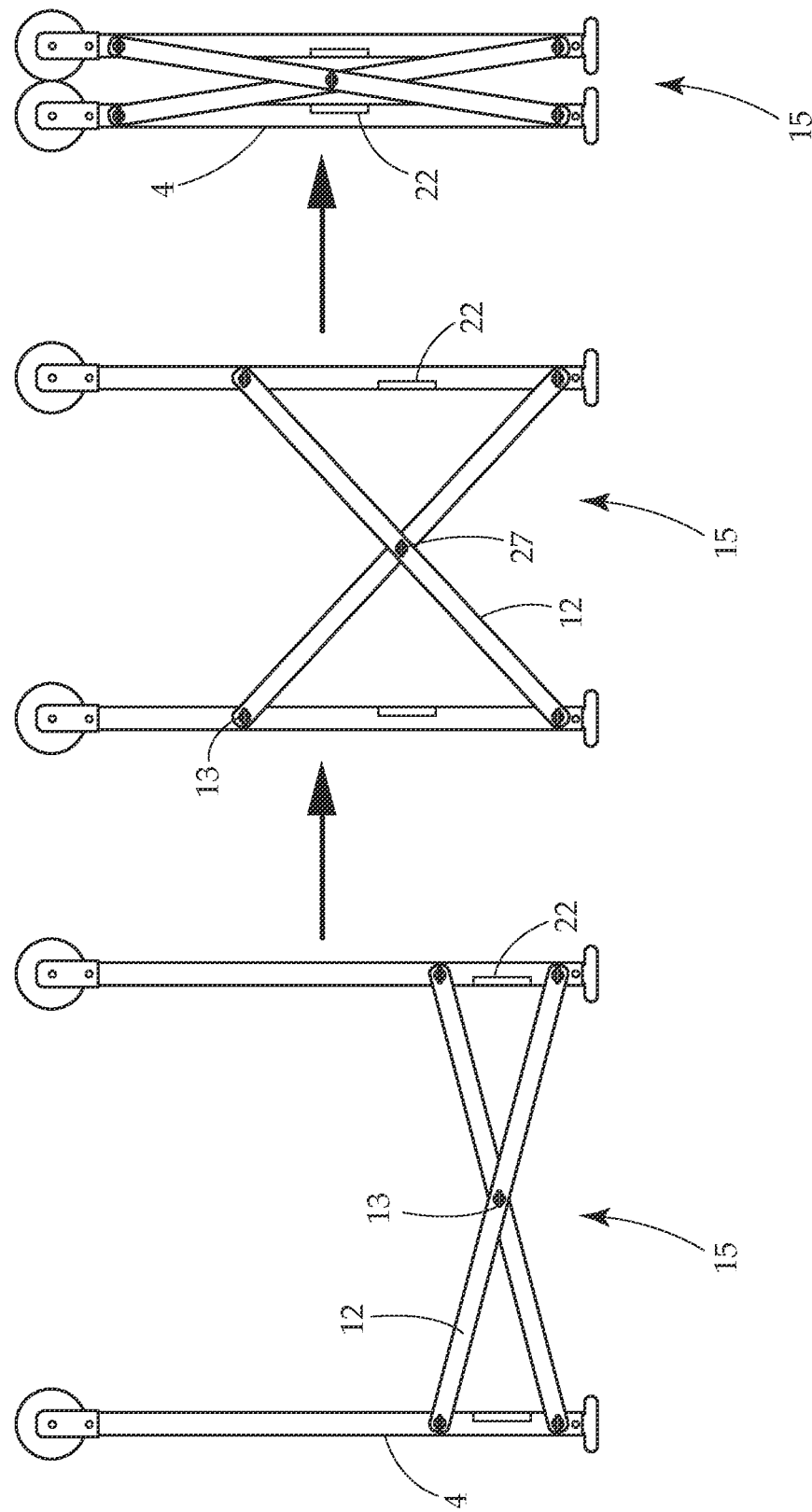
FIG. 3 provides a perspective view of yet another embodiment of the present disclosure.

FIG. 3 shows another embodiment of the carpenter's accordion 15. In this embodiment, each leg 4 of the accordion 15 comprises a strip of Velcro® 22 attached to the legs 4. In this embodiment, the movable bars 12 are secured to each other and the legs 4 by butterfly, bolt, and washer combinations 13. The combinations 13 allow the carpenter's accordion 15 to be compressed or folded in on itself with less friction or resistance than other embodiments. As shown in FIG. 3, the accordion 15 can be partially compressed or folded, and the tightening of the butterflies 27 in the butterfly, bolt, and washer combinations 13 allows the movable bars 12 to be locked in place at a variety of partially folded or compressed increments. Also, as shown in the embodiment in FIG. 3, when the carpenter's accordion 15 is fully compressed or folded in on itself the Velcro® strips 22 on opposing legs 4 attach to each other and secure the accordion 15 in the fully compressed position.

Figure 4:
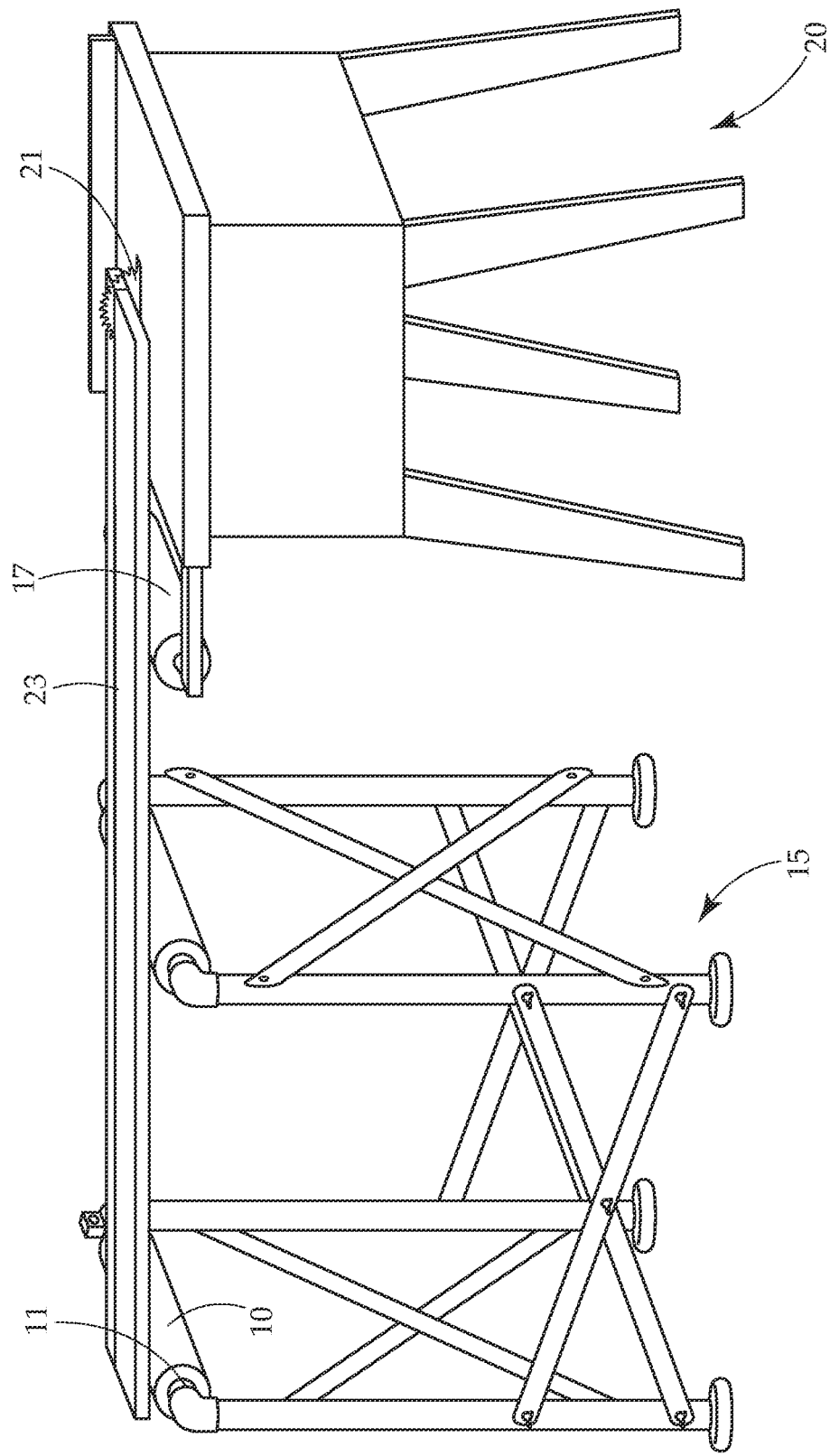
FIG. 4 provides a perspective view of another embodiment of the present disclosure.

FIG. 4 shows an embodiment of a stock cutting system utilizing the carpenter's accordion 15. In this embodiment, the rollers 10 have already been substantially leveled with the outfeed support 17 and the top surface of the table saw 20. The stock 23 is being rip cut by the blade 21. When the rip cut stock 23 comes into contact with a roller 10, the wheel bearings 11 allow to roller 10 to rotate smoothly and prevent any counter force or resistance from pushing the stock 23 back towards the blade 21.

Figure 5:
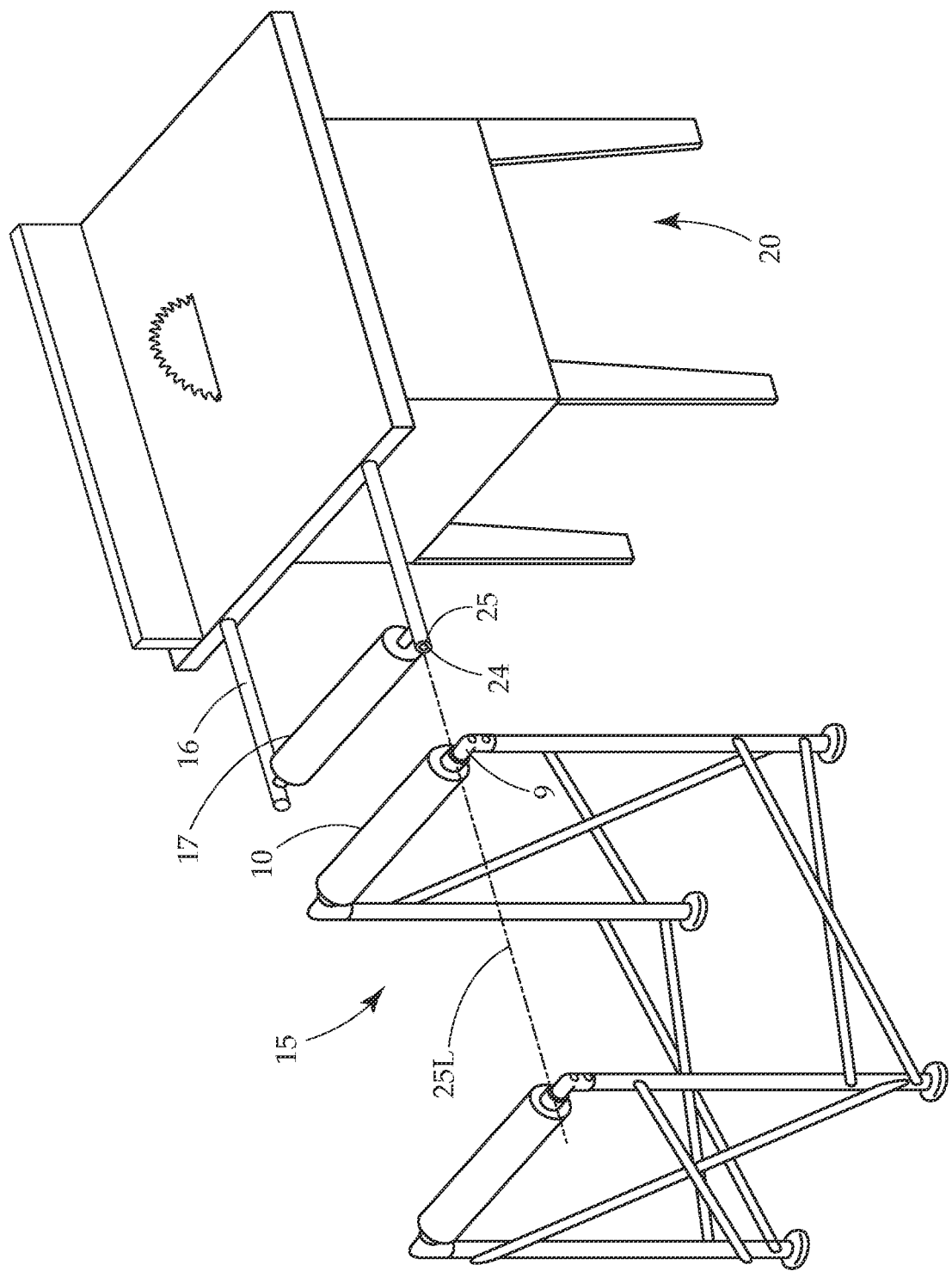
FIG. 5 provides a perspective view of yet another embodiment of the present disclosure.

FIG. 5 shows another embodiment the carpenter's accordion 15 and the table saw 20. In this embodiment, one of the telescoping outfeed support bars 16 defines a housing 24, within which a laser level 25 is encased. The laser level 25 emits a light beam 25L that allows the user (not shown) to ensure that the pipe 9 is substantially level with the outfeed support bar 16. Alternatively or simultaneously, the light beam 25L from the laser level 25 also allows the user (not shown) to ensure that the rollers 10 are substantially level with the outfeed support 17 and the top surface of the table saw 20.

Figure 6:
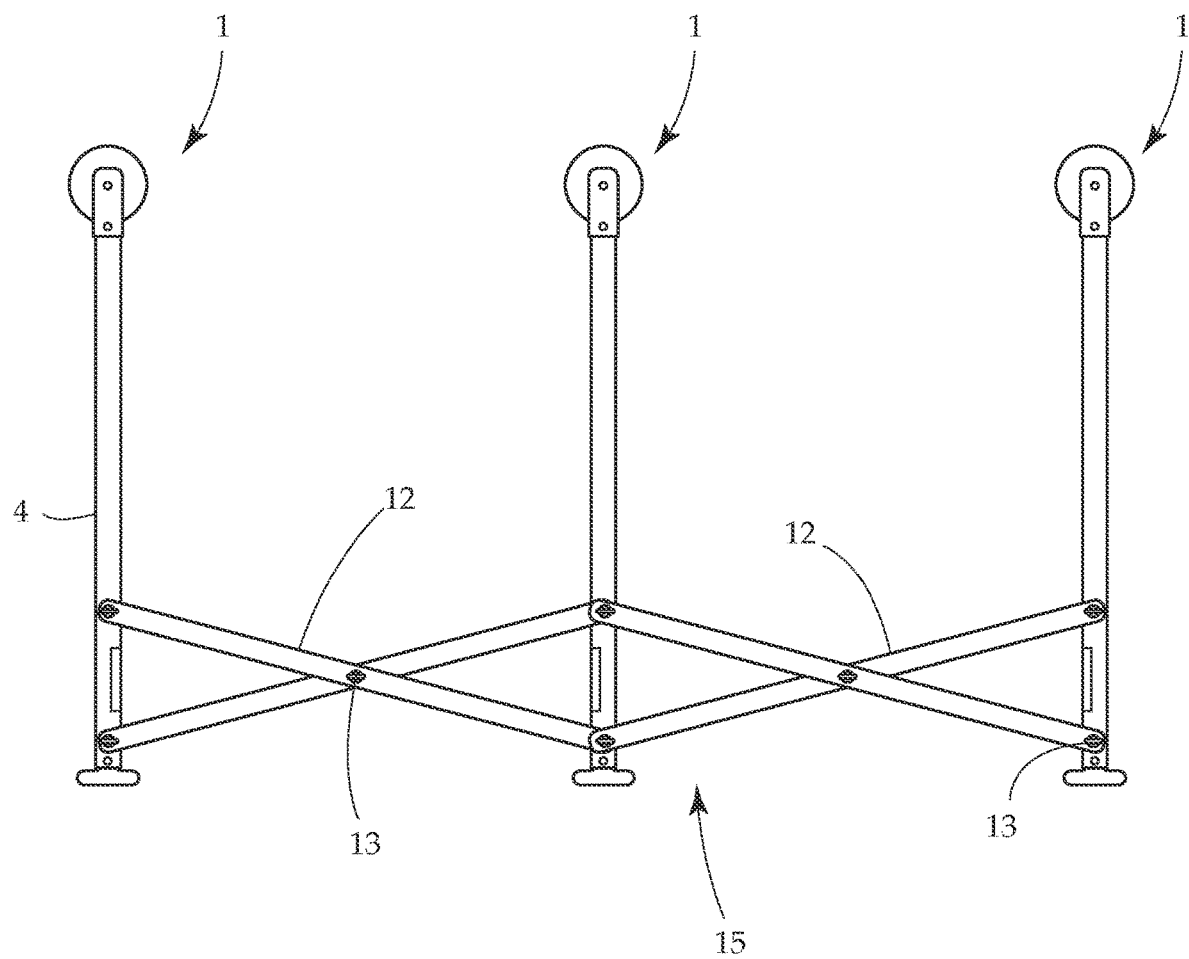
FIG. 6 provides a perspective view of another embodiment of the present disclosure.

Finally, FIG. 6 shows another embodiment of the carpenter's accordion 15, which utilizes three sections 1. In the embodiment shown, each section 1 is connected to another section by at least two sets of movable bars 12, which are secured to each other and the legs 4 with combinations 13.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A carpenter's accordion comprising:
   a first section and a second section;
   wherein the first section comprises two legs and the second section comprises two legs, each one of the two legs of the first section having a top and a bottom and each one of the two legs of the second section having a top and a bottom;
   wherein the two legs of the first section are connected to opposite ends of a plurality of cross support bars and the two legs of the second section are connected to opposite ends of a plurality of cross support bars;
   wherein the first section and the second section are connected to each other by the two legs of the first section and the two legs of the second section being connected to opposite ends of a plurality of movable bars;

wherein the first section further comprises a pipe having two ends, one of the two ends being connected the top of one of the two legs of the first section and the other one of the two ends being connected to the top of the other one of the two legs of the first section;

wherein the second section further comprises a pipe having two ends, one of the two ends being connected to the top of one of the two legs of the second section and the other one of the two ends being connected to the top of the other one of the two legs of the second section;

wherein the first section and the second section each comprise two of four curved corner pieces, wherein each one of the four curved corner pieces are connected to the top of each one of the two legs of the first section and the second section, and the two ends of the pipe of the first section and the pipe of the second section are connected to the top of each one of the two legs of the first section and the second section by first being connected to one of the four curved corner pieces; wherein the first section and the second section each further comprise one roller of two rollers, wherein the pipe of the first section extends through the one roller of the first section and the pipe of the second section extends through the one roller of the second section; and a laser level attached to one of the two curved corner pieces of the first section.

2. The carpenter's accordion of claim 1 further comprising four stands, wherein each one of the two legs of the first section and the second section comprise one of the four stands, wherein a telescoping portion of each one of the four stands is fitted within the bottom of each one of the two legs of the first section and the second section.

3. The carpenter's accordion of claim 2 further comprising four pins, wherein each one of the two legs of the first section and the second section comprise one of the four pins extending through the bottom of each one of the two legs of the first section and the second section, the telescoping portion of each one of the four stands of each one of the two legs of the first section and the second section defines a plurality of fixing apertures, and each one of the four pins engages with one of the plurality of fixing apertures.

4. The carpenter's accordion of claim 1, wherein the opposite ends of the plurality of cross support bars of the first section are connected to the two legs of the first section by a plurality of screws and the opposite ends of the plurality of cross support bars of the second section are connected to the two legs of the second section by a plurality of screws.

5. The carpenter's accordion of claim 1, wherein the opposite ends of the plurality of movable bars are connected to the two legs of the first section and the two legs of the second section by a plurality of butterfly, bolt, and washer combinations.

6. The carpenter's accordion of claim 1, further comprising four wheel bearings, wherein the pipe of the first section and the pipe of the second section each comprise two of the four wheel bearings, wherein each one of the four wheel bearings is positioned at one of the two ends of the pipe of the first section and the pipe of the second section, and each one of the four wheel bearings contacts the interiors of the two rollers.

7. The carpenter's accordion of claim 1, wherein each one of the two legs of the first section and second section comprise a hook and loop fastener.

8. A stock cutting system comprising:
a carpenter's accordion, the carpenter's accordion comprising:
a first section and a second section;
wherein the first section comprises two legs and the second section comprises two legs, each one of the two legs of the first section having a top and a bottom and each one of the two legs of the second section having a top and a bottom;
wherein the two legs of the first section are connected to opposite ends of a plurality of cross support bars and the two legs of the second section are connected to opposite ends of a plurality of cross support bars;
wherein the first section and the second section are connected to each other by the two legs of the first section and the two legs of the second section being connected to opposite ends of a plurality of movable bars;
wherein the first section further comprises a pipe having two ends, one of the two ends being connected the top of one of the two legs of the first section and the other one of the two ends being connected to the top of the other one of the two legs of the first section; and,
wherein the second section further comprises a pipe having two ends, one of the two ends being connected to the top of one of the two legs of the second section and the other one of the two ends being connected to the top of the other one of the two legs of the second section;
wherein a laser level being attached to the first section;
a table saw separate from the carpenter's accordion, the table saw comprising:
a blade attached to a top surface of the table saw, the top surface of the table saw being connected to a body, and the body connected to and supported by a plurality of supporting legs;
wherein an outfeed support is connected to a plurality of telescoping outfeed support bars, the plurality of outfeed support bars being connected to the top surface of the table saw or the body of the table saw; and
a piece of stock on the top surface of the table saw, extending away from the top surface of the table saw and engaging with one of the two sections of the carpenter's accordion.

9. The system of claim 8, wherein the carpenter's accordion further comprises:
four stands and four pins;
wherein each one of the two legs of the first section and the second section comprise one of the four stands, wherein a telescoping portion of each one of the four stands is fitted within the bottom of each one of the two legs of the first section and the second section;
wherein each one of the two legs of the first section and the second section comprise one of the four pins extending through the bottom of each one of the two legs of the first section and the second section, the telescoping portion of each one of the four stands of each one of the two legs of the first section and the second section defines a plurality of fixing apertures, and each one of the four pins engages with one of the plurality of fixing apertures.

10. The system of claim 8, wherein the opposite ends of the plurality of cross support bars of the first section are connected to the two legs of the first section by a plurality of screws and the opposite ends of the plurality of cross support bars of the second section are connected to the two legs of the second section by a plurality of screws.

11. The system of claim 8, wherein the opposite ends of the plurality of movable bars are connected to the two legs of the first section and the two legs of the second section by a plurality of butterfly, bolt, and washer combinations.

12. The system of claim 8, wherein the carpenter's accordion further comprises four curved corner pieces, wherein the first section and the second section each comprise two of the four curved corner pieces, wherein each one of the four curved corner pieces are connected to the top of each one of the two legs of the first section and the second section, and the two ends of the pipe of the first section and the pipe of the second section are connected to the top of each one of the two legs of the first section and the second section by first being connected to one of the four curved corner pieces.

13. The system of claim 8, wherein the carpenter's accordion further comprises:
    two rollers, having interiors and exteriors, and four wheel bearings;
    wherein the first section and the second section each further comprise one roller of the two rollers, wherein the pipe of the first section extends through the one roller of the first section and the pipe of the second section extends through the one roller of the second section;
    wherein the pipe of the first section and the pipe of the second section each comprise two of the four wheel bearings, wherein each one of the four wheel bearings is positioned at one of the two ends of the pipe of the first section and the pipe of the second section, and each one of the four wheel bearings contacts the interiors of the two rollers.

14. A stock cutting system comprising:
    a carpenter's accordion, the carpenter's accordion comprising:
        a first section and a second section;
        wherein the first section comprises two legs and the second section comprises two legs, each one of the two legs of the first section having a top and a bottom and each one of the two legs of the second section having a top and a bottom;
        wherein the two legs of the first section are connected to opposite ends of a plurality of cross support bars and the two legs of the second section are connected to opposite ends of a plurality of cross support bars;
        wherein the first section and the second section are connected to each other by the two legs of the first section and the two legs of the second section being connected to opposite ends of a plurality of movable bars;
        wherein the first section further comprises a pipe having two ends, one of the two ends being connected the to of one of the two legs of the first section and the other one of the two ends being connected to the top of the other one of the two legs of the first section; and,
        wherein the second section further comprises a pipe having two ends one of the two ends being connected to the top of one of the two legs of the second section and the other one of the two ends being connected to the to of the other one of the two legs of the second section;
        wherein one of the plurality of telescoping outfeed support bars of the table saw defines a housing and comprises a laser level, wherein the laser level is encased within the housing; and
    a table saw separate from the car enter's accordion the table saw comprising:
        a blade attached to a top surface of the table saw, the top surface of the table saw being connected to a body, and the body connected to and supported by a plurality of supporting legs;
        wherein an outfeed support is connected to a plurality of telescoping outfeed support bars, the plurality of outfeed support bars being connected to the too surface of the table saw or the body of the table saw; and
        a piece of stock on the top surface of the table saw, extending away from the to surface of the table saw and engaging with one of the two sections of the carpenter's accordion.

* * * * *